United States Patent [19]
Atmur et al.

[11] Patent Number: 5,947,094
[45] Date of Patent: *Sep. 7, 1999

[54] METHODS AND APPARATUS FOR MAKING CERAMIC MATRIX COMPOSITE LINED AUTOMOTIVE PARTS AND FIBER REINFORCED CERAMIC MATRIX COMPOSITE AUTOMOTIVE PARTS

[75] Inventors: Steven Donald Atmur, Riverside; Thomas Edward Strasser, Corona, both of Calif.

[73] Assignee: Northrop Grumman Corporation, Los Angeles, Calif.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/962,339

[22] Filed: Oct. 31, 1997

Related U.S. Application Data

[62] Division of application No. 08/515,849, Aug. 16, 1995, Pat. No. 5,632,320.

[51] Int. Cl.$^6$ .......................... F02B 75/08; B22D 19/08; F01N 7/10
[52] U.S. Cl. .............................. 123/668; 164/98; 60/323; 428/312.6
[58] Field of Search .................... 164/98, 97; 428/312.4, 428/312.6, 307.7, 313.9; 264/60, 640; 60/323; 427/266; 123/668, 669

[56] References Cited

U.S. PATENT DOCUMENTS

| | | | |
|---|---|---|---|
| 5,066,626 | 11/1991 | Fukao et al. | 501/128 |
| 5,142,863 | 9/1992 | Lishio et al. | 60/272 |
| 5,258,084 | 11/1993 | Leung et al. | 156/89 |

*Primary Examiner*—Kuang Y. Lin
*Attorney, Agent, or Firm*—Terry J. Anderson; Karl J. Hoch, Jr.

[57] ABSTRACT

A method of forming a breakage resistant, erosion resistant ceramic liner for a part comprising the steps of, forming a liner of a ceramic material containing pores; filling the pores with a pre-ceramic polymer resin; and, firing the liner saturated with a pre-ceramic polymer resin at a temperature and for a time which converts the resin into a ceramic within the pores. The liner can be mechanically attached, adhesively bonded or, a metal part can be cast onto the liner by placing the liner within the metal casting mold for the part as a sidewall or integral element thereof. The invention also includes method for producing parts and liners of fiber reinforced ceramic matrix composite by a resin transfer molding process or the like wherein fiber preforms are saturated with liquid pre-ceramic polymer resin. The preforms are then polymerized in a mold, the part removed from the mold, and then fired to transform the polymer to ceramic. The process can also be employed to form hollow parts such as manifolds.

8 Claims, 8 Drawing Sheets

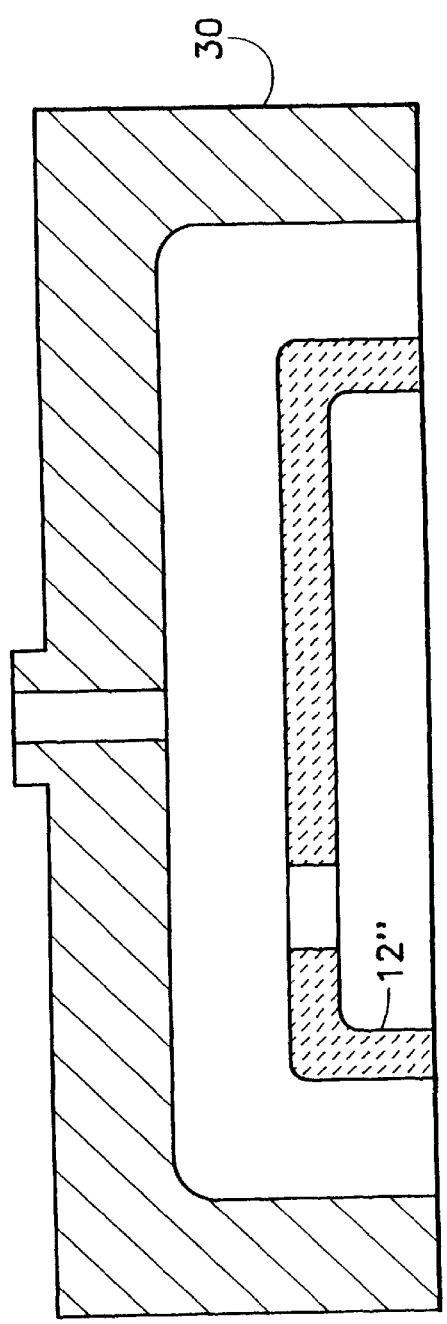
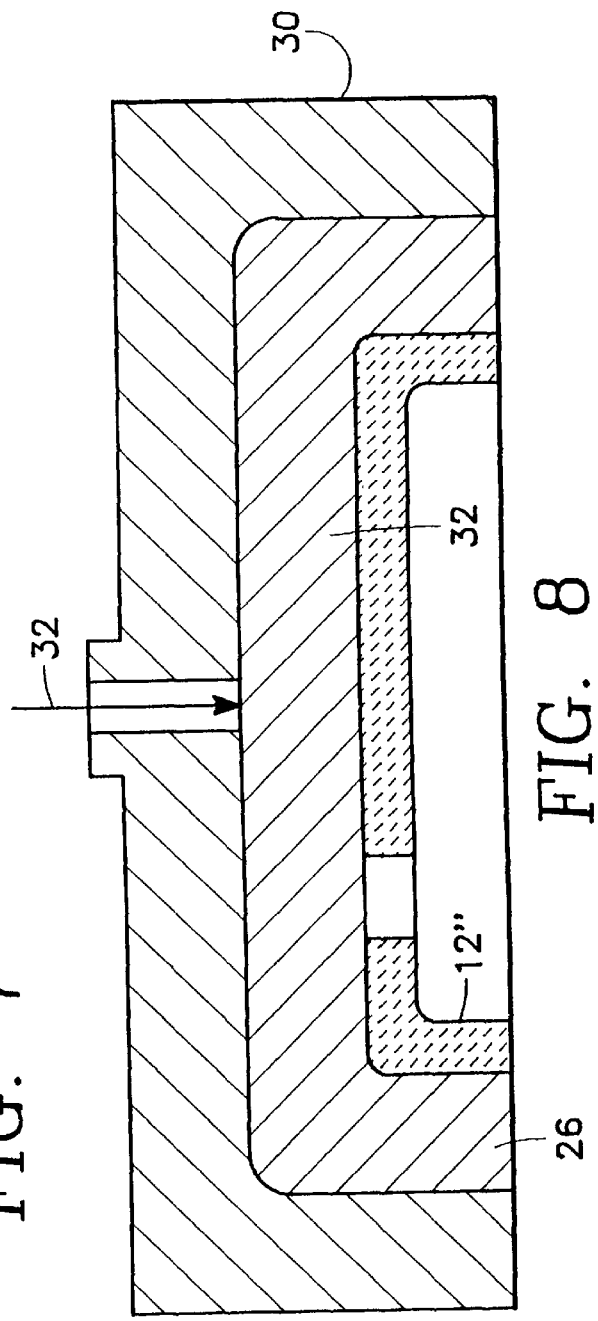

METHODS AND APPARATUS FOR MAKING CERAMIC MATRIX COMPOSITE LINED AUTOMOTIVE PARTS AND FIBER REINFORCED CERAMIC MATRIX COMPOSITE AUTOMOTIVE PARTS

This is a division of application Ser. No. 08/515,849, filed Aug. 16, 1995, now U.S. Pat. No. 5,632,320.

BACKGROUND OF THE INVENTION

1. Technical Field

This invention relates to the making of cast metal parts with ceramic liners for automobiles and, more particularly, to (1) a method of forming a metal part having a breakage resistant ceramic liner comprising the steps of, forming a metal part having a mating surface for receiving the liner; forming a liner of a ceramic material containing pores; filling the pores with a pre-ceramic polymer resin; firing the pre-ceramic polymer resin (hereinafter used interchangeably with the term polymer-derived ceramic resin) saturated liner at a temperature which converts the resin into a ceramic within the pores, and, attaching the ceramic liners to the mating surface of the metal part; (2) to methods for accomplishing the same result comprising the steps of forming a liner of a ceramic material containing pores; filling the pores with a pre-ceramic polymer resin; firing the pre-ceramic polymer resin saturated liner at a temperature and for a time which converts the resin into a ceramic within the pores; positioning the liner within a mold for the metal part with the mating surface of the liner facing into a portion of the mold to be occupied by metal forming the part; and, filling the mold with molten metal to form the part with an integral, cast-in-place, ceramic insert; and, (3) to a method of forming fiber reinforced ceramic matrix composite (FRCMC) parts and liners comprising the steps of, forming a preform in the shape of the part from fibers of a generic fiber system (hereinafter used interchangeably with the term reinforcing fibers employable in fiber reinforced ceramic matrix composites; placing the preform in a cavity of a mold having the shape of the part; forcing a liquid polymer-derived ceramic resin through the cavity to fill the cavity and saturate the preform; heating the mold at a temperature and for a time associated with the polymer-derived ceramic resin which transforms the liquid polymer-derived ceramic resin-saturated preform into a polymer composite part; removing the polymer composite part from the mold; and, firing the polymer composite part in an inert atmosphere at a temperature and for a time associated with the polymer-derived ceramic resin which transforms the polymer-derived ceramic resin into a ceramic whereby the polymer composite part is transformed into a fiber reinforced ceramic matrix composite part.

2. Background Art

Operating temperatures of automobile and like internal combustion engines have increased for various reasons such as improved combustion efficiency and reduction of the fuel to air ratio (i.e. leaner burning engines) for the purposes of reducing emitted pollutants resulting from more complete burning of the fuel. Accordingly, there has been a corresponding need to protect metal parts subjected to these increased temperatures. An obvious approach tried with limited success in the prior art is to line the metal parts with ceramic. Thus, for example, we have an exhaust manifold 10 with a monolithic ceramic lining 12 as depicted in FIG. 1 and a power head 14 with a ceramic lining 12 as depicted in FIG. 2 being known in the prior art.

The problem of this prior art approach can be best understood with reference to FIG. 3. As can be seen in the enlarged drawing, the monolithic ceramic material of the lining 12 as employed in the prior art is a porous material having a multitude of pores 16 throughout. Thus, the lining 12 of the prior art is fairly delicate, with nominal erosion resistance, and is easily broken if the part is dropped, struck, or otherwise subjected to a large force. If the lining 12 of the power head 14 breaks and a piece falls off inside the operating engine, the inside of the cylinder of the engine will most likely be heavily scored by the hard ceramic edges bouncing about. For both the power head 14 and the exhaust manifold 10, any gap or break in the ceramic liner will eventually result in damage to or the destruction of the unprotected underlying metal. A crack through the exhaust manifold 10 or through the power head 14 typically will require complete replacement of the part.

Also, the lining of a part with the monolithic ceramic material according to prior art techniques can be a delicate, costly, and time-consuming process.

Wherefore, it is an object of the present invention to provide a ceramic lining for an automotive internal combustion engine part or the like which is toughened to resist breakage and erosion.

It is another object of the present invention to provide a method for applying a ceramic lining to an automotive internal engine part or the like, which is simple, inexpensive, and can be rapidly assembled so as not to impact the high rate manufacturing schedule associated with automotive components.

It is still another object of the present invention to provide a method for applying a ceramic lining to an automotive internal engine part or the like, wherein the lining is cast into the part as part of the molding process.

It is yet another object of the present invention to provide a method for creating fiber reinforced ceramic matrix composite preforms for use in lining automotive internal engine parts and making automotive internal engine parts.

Other objects and benefits of this invention will become apparent from the description which follows hereinafter when read in conjunction with the drawing figures which accompany it.

SUMMARY OF THE DISCLOSURE

The foregoing objects have been attained in a first aspect of the present invention by the method for forming a metal part having a breakage resistant ceramic liner comprising the steps of, forming a metal part having a mating surface for receiving the liner; forming a liner of a ceramic material containing pores; filling the pores with a pre-ceramic polymer resin; firing the pre-ceramic polymer resin saturated liner at a temperature and for a time (designated by the resin manufacturer) which converts the resin into a ceramic within the pores; and, bonding the ceramic liner to the mating surface of the metal part.

In one embodiment, the step of forming the liner of a ceramic material containing pores comprises pouring an inexpensive castable cementatious slurry into a liner-shaped mold, firing the molded slurry material for a time and at a temperate which converts it into a handleable pre-ceramic preform, removing the pre-ceramic preform of the from the mold, and firing the pre-ceramic preform for a time and at a temperate which converts it into a substantially porous free ceramic preform containing pores formed by out-gassing. And, the step of filling the pores with a polymer-derived ceramic resin comprises placing the liner into a bath containing a liquid pre-ceramic polymer resin until the pores are saturated with the resin. Preferably, the resin is silicon-carboxyl resin (sold by Allied-Signal under the trade name Blackglas).

In a second embodiment, the step of forming the liner of a ceramic material containing pores comprises positioning a fiber preform into a liner-shaped mold to occupy 30% to 60% of the volume of the mold, forcing a liquid pre-ceramic polymer resin through the preform to fill the remaining volume of the mold with the liquid pre-ceramic polymer resin, the preform and the pre-ceramic polymer resin within the mold for a time and at a temperate which converts it into a handleable pre-ceramic preform, removing the pre-ceramic preform from the mold, and firing the pre-ceramic preform for a time and at a temperate which converts the liquid pre-ceramic polymer resin into a ceramic pores formed by out-gassing. As a result of filling the fiber preform with a pre-ceramic polymer resin and firing the preform and the pre-ceramic polymer resin within the mold, the porosity of the fiber preform is reduced Silicon-carboxyl resin, e.g. Blackglas.

The foregoing objects have also been attained in a second aspect of the present invention by the method for forming a metal part having a breakage resistant ceramic liner comprising the steps of, forming a liner of a ceramic material containing pores; filling the pores with a pre-ceramic polymer resin; firing the pre-ceramic polymer resin saturated liner at a temperature and for a time (as designated by the resin manufacturer), which converts the resin into a ceramic within the pores; positioning the liner within a mold for the metal part with the mating surface of the liner facing into a portion of the mold to be occupied by the metal forming the part; and, filling the mold with molten metal to form the part.

As with the first aspect, the step of forming the liner of a ceramic material containing pores can comprise either approach described above. And, the step of filling the pores with a polymer-derived ceramic resin again comprises placing the liner into a bath containing a liquid pre-ceramic polymer resin until the pores are saturated with the resin; firing the pre-ceramic polymer resin saturated liner at a temperature and for a time which converts the resin into a ceramic within the pores.

In all cases where the pores formed by outgassing are filled, it is preferred to repeat the pore-filling and re-heating process several times to virtually totally remove the pores from the final product.

In another aspect of the present invention, a method of making a fiber reinforced ceramic matrix composite automotive part is disclosed comprising the steps of, forming a preform in the shape of the part from fibers of a generic fiber system employable in fiber reinforced ceramic matrix composites; placing the preform in a cavity of a mold having the shape of the part; forcing a liquid polymer-derived ceramic resin through the cavity to fill the cavity and saturate the preform; heating the mold at a temperature and for a time associated with the polymer-derived ceramic resin which transforms the liquid polymer-derived ceramic resin-saturated preform into a polymer composite part; removing the polymer composite part from the mold; and, firing the polymer composite part in an inert atmosphere at a temperature and for a time associated with the polymer-derived ceramic resin which transforms the polymer-derived ceramic resin into a ceramic whereby the polymer composite part is transformed into a fiber reinforced ceramic matrix composite part.

Preferably, the method also includes the steps of, immersing the fiber reinforced ceramic matrix composite part containing pores formed by outgassing during firing into a bath of the liquid polymer-derived ceramic resin to fill the pores with the liquid polymer-derived ceramic resin; firing the fiber reinforced ceramic matrix composite part in an inert atmosphere at a temperature and for a time associated with. the polymer-derived ceramic resin which transforms the polymer-derived ceramic resin in the pores into a ceramic; and, repeating this process until the pore density within the final fiber reinforced ceramic matrix composite part is less than a pre-established percentage affording maximum strength to the part.

The preferred method is also adaptable to forming hollow parts such as engine manifolds by employing the steps of, forming a first preform in the shape of a lower portion of the manifold from fibers of a generic fiber system employable in fiber reinforced ceramic matrix composites; placing the first preform in a cavity of a first mold having the shape of the lower portion of the manifold; forcing a liquid polymer-derived ceramic resin through the cavity to fill the cavity and saturate the first preform; heating the first mold at a temperature and for a time associated with the polymer-derived ceramic resin which transforms the liquid polymer-derived ceramic resin-saturated first preform into a first polymer composite part; removing the first polymer composite part from the mold; forming a second preform in the shape of an upper portion of the manifold from fibers of the generic fiber system; placing the second preform in a cavity of a second mold having the shape of the upper portion of the manifold; forcing the liquid polymer-derived ceramic resin through the cavity to fill the cavity and saturate the second preform; heating the second mold at a temperature and for a time associated with the polymer-derived ceramic resin which transforms the liquid polymer-derived ceramic resin-saturated second preform into a second polymer composite part; removing the second polymer composite part from the mold; fitting the first polymer composite part and the second polymer composite part together along mating edges to form the manifold as a hollow conduit-shaped part; and, firing the polymer composite manifold in an inert atmosphere at a temperature and for a time associated with the polymer-derived ceramic resin which transforms the polymer-derived ceramic resin into a ceramic whereby the polymer composite manifold is transformed into a fiber reinforced ceramic matrix composite manifold and the upper portion and the lower portion are fused together along the mating edges.

Pores formed by outgassing are preferably sealed in the manner described above to give maximum strength to the resultant manifold and seal any leakage that may exist along the mating edges.

Where the manifold is an exhaust manifold to be internally filled with a ceramic foam catalyst substrate structure the process and required tooling can be greatly simplified by prior to the step of placing the second preform in a cavity of a second mold having the shape of the upper portion of the manifold additionally including the steps of, placing the first preform as part of a cavity-defining wall of the second mold; and, placing the ceramic foam catalyst substrate structure in the first preform whereby the first preform and the ceramic foam catalyst substrate structure in combination form part of the cavity of the second wall.

BRIEF DESCRIPTION OF THE DRAWINGS

FIG. 7 is a simplified cross section of a third step in making a ceramic lined automobile part according to the present invention in a second approach.

FIG. 8 is a simplified cross section of a fort step in making a ceramic lined automobile part according to the present invention in the second approach.

DETAILED DESCRIPTION OF THE PREFERRED EMBODIMENT

According to one aspect of the present invention, the typical prior art ceramic lining as described above is toughened against breakage by making it as a polymer-derived ceramic matrix composite (CMC) material. In a conventional polymer-derived CMC, a generic fiber system is disbursed throughout a pre-ceramic polymer resin. The mixture is then fired at a temperature and for a time as recommended by the material supplier in order to convert the resin into a ceramic material thereby forming the part of a fiber reinforced ceramic matrix composite (FRCMC) material.

In this aspect of the present invention, low strength, porous ceramic material is substituted for the fiber system in the following manner.

Figure 3:
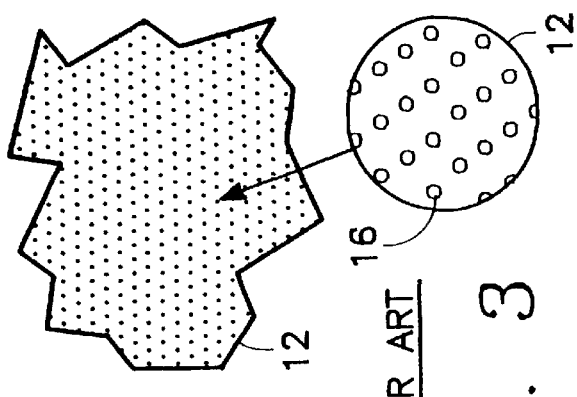
FIG. 3 is an enlarged simplified drawing of the monolithic ceramic material employed in the prior art of FIGS. 1 and 2 depicting the pores contained therein.
Figure 2:
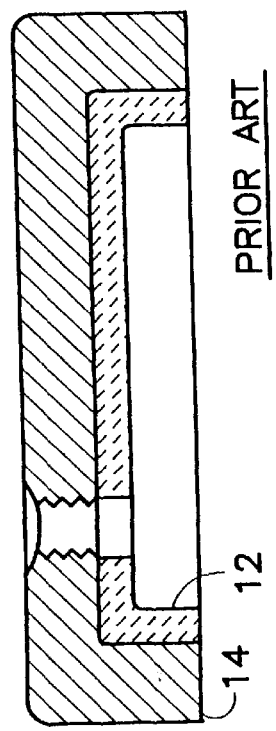
FIG. 2 is a simplified cross section of a prior art monolithic ceramic lined automobile power head.
Figure 1:
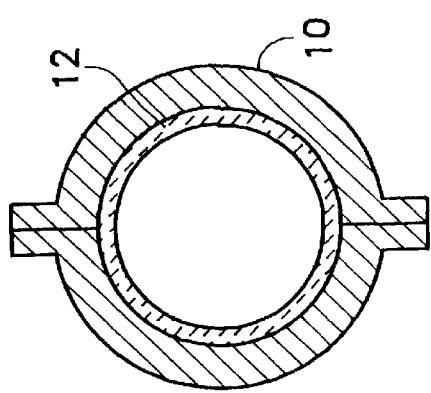
FIG. 1 is a simplified cross section of a prior art monolithic ceramic lined automobile exhaust manifold.
Figure 4:
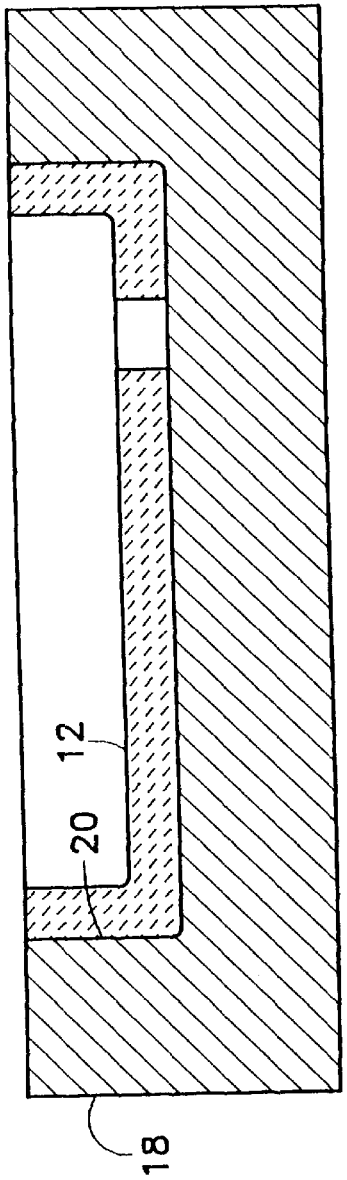
FIG. 4 is a simplified cross section of a first step in making a ceramic lined automobile part according to the present invention in a first approach.
Figure 6:
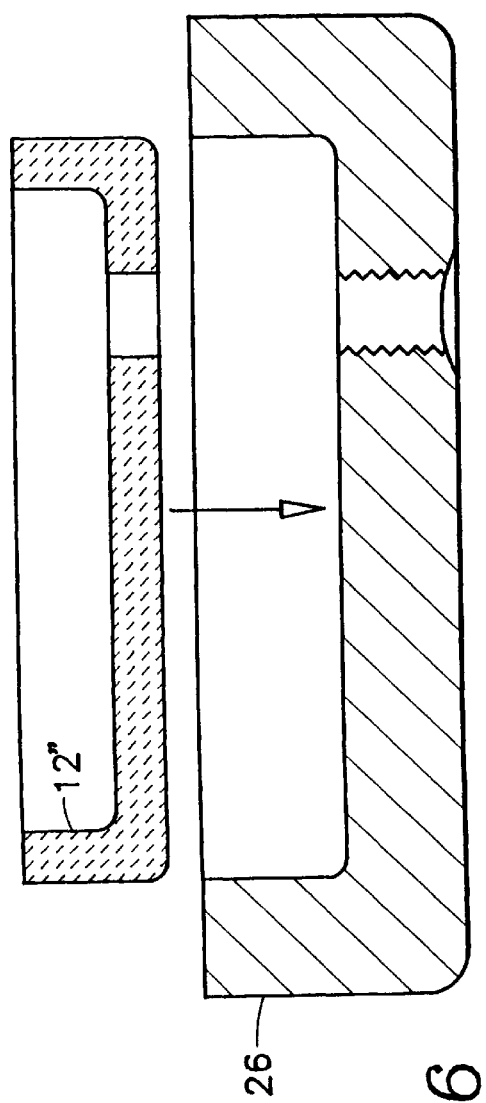
FIG. 6 is a simplified cross section of a third step in making a ceramic lined automobile part according to the present invention.

One technique for lining a metal part with ceramic is to make a mold 18 having a mating surface 20 shaped to fit the metal part as depicted in FIG. 4. After molding, the resultant liner 12 is then fit into the metal part in its intended position and mechanically held or bonded in place using commercially available high temperature adhesives or the like. To use this approach according to the present invention, the liner 12 is cast in the usual manner as depicted in FIG. 4 using a cementatious slurry material such as, but not limited to, that commercially sold under the trade name Ceramacast by AREMCO. The cast liner 12 is fixed in the usual manner as taught by the manufacturer to form the low strength ceramic liner 12'. According to the present invention, the ceramic liner 12' is then immersed in a vessel 22 containing a bath of a pre-ceramic polymer resin 24. The preferred resin 24 is a pre-ceramic polymer, silicon-carboxyl resin (sold by Allied Signal under the trade name Blackglas). The Blackglas resin has a viscosity substantially equal to water. Thus, it easily penetrates and fills the pores 16. Many liquid resin materials have a more honey-like viscosity. Such resins cannot fill the pores 16 and, therefore, will not attain the objects of the present invention. When the resin 24 has saturated the pores 16 of the ceramic liner 12', the liner 12' is again fired at a temperature and for a time as taught by the manufacturer of the resin, which converts the resin 24 into a ceramic within the pores 16, thereby creating the CMC liner 12". The CMC liner 12" can then be bonded into its mating part 26 as depicted in FIG. 6.

Figure 5:
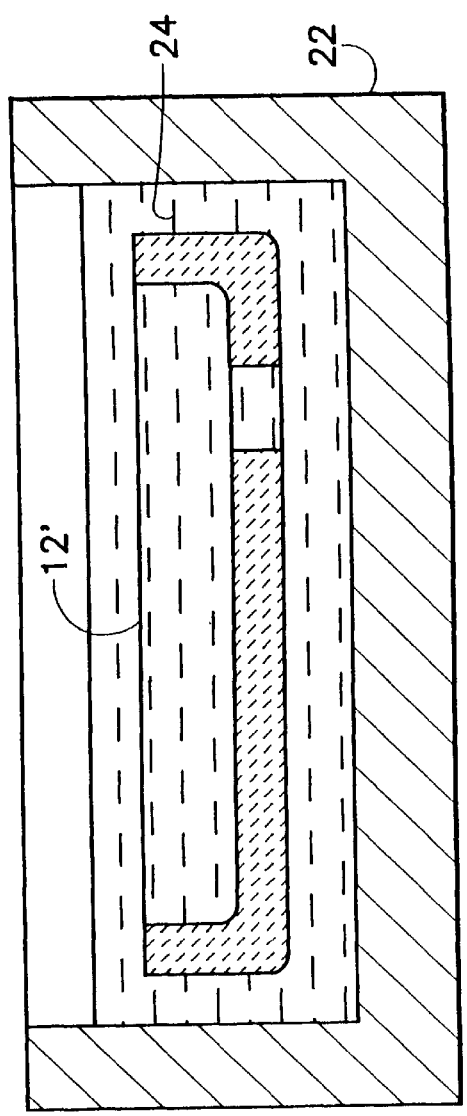
FIG. 5 is a simplified cross section of a second step in making a ceramic lined automobile part according to the present invention.

In an alternate approach as depicted in FIGS. 7 and 8, the process is greatly simplified and the resultant interface between the liner 12" and its associated part 26 is strengthened by casting the metal part 26 directly onto/around the pre-existing toughened CMC liner 12'. The liner 12 is first cast as in FIG. 4. After the steps described above with respect to FIG. 5 of firing the liner 12 to form the liner 12', filling the pores 16 with resin 24, and firing the liner 12' to create the CMC liner 12", the CMC liner 12" is placed within a mold 30 compatible for casting metal 32 for the part 26 as depicted in FIG. 7 facing into the space of the mold 30 to be occupied by the metal. The mold 30 is then filled with molten metal 32 as depicted in FIG. 8 to form the part 26 with the liner 12" firmly held in place within the metal 32 when the metal 32 cools and hardens. Since the liner 12" is a toughened CMC, it is able to withstand the temperatures of the metal molding process without being damaged thereby.

Figure 9:
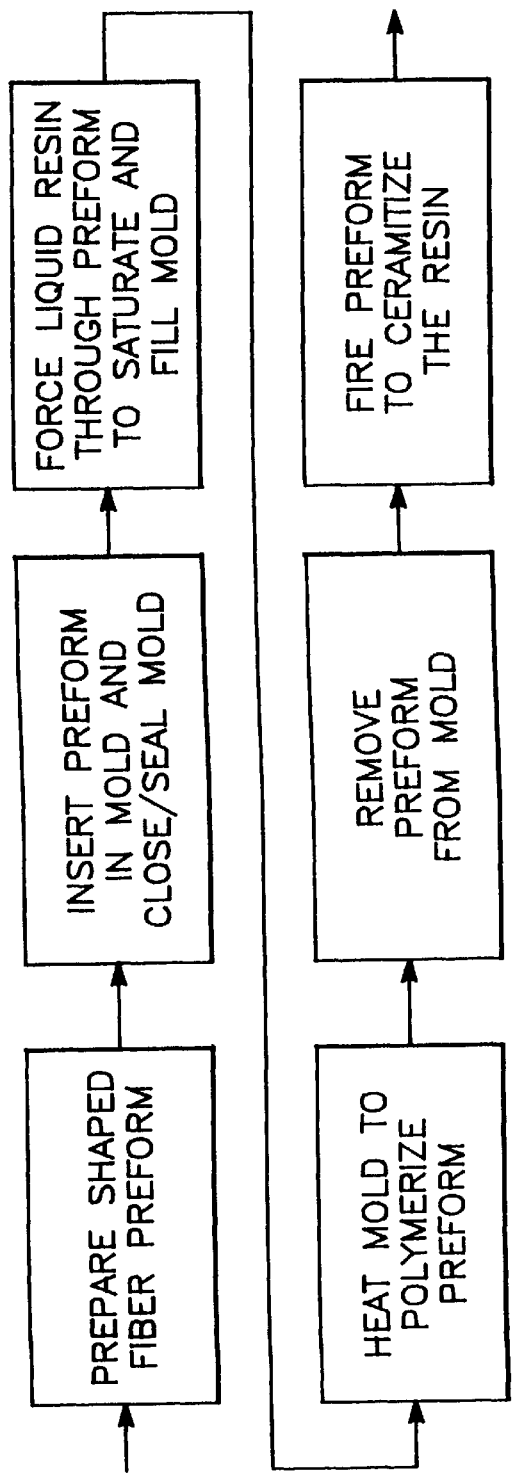
FIG. 9 is a functional block diagram of the basic steps of making fiber reinforced ceramic matrix composite preforms for use in practicing the present invention in a preferred approach.

Having thus described alternate methods for improving the strength of ceramic automotive parts liners and for casting liners directly into metal automotive parts, a preferred Resin Transfer Molding (RTM) method and apparatus for forming automotive parts or liners therefor of a ceramic matrix composite material according to a preferred embodiment of the present invention will now be described in detail. A functional block diagram of the steps of the basic RTM approach is depicted in FIG. 9.

The first step is to form a shaped preform from the generic fiber system that is to be used. This is then inserted into a preform mold and the mold sealed. In the preferred approach, the generic fiber system occupies from 30% up to about 60% of the internal volume of the mold. As an alternative, but not preferred, approach, the mold can be filled with generic fiber chop to the same packing density by volume. A pre-ceramic polymer resin is then forced through the fibers to fill the remaining internal volume of the mold.

The preferred resin is the previously described pre-ceramic polymer, silicon-carboxyl resin sold by Allied Signal under the trade name Blackglas. This is because of its low viscosity which allows it to be forced through and saturate a high volume density of the generic fiber preform. The tighter the fiber density, the stronger the part will be. Thus, to use a resin of higher viscosity, the packing density of the fibers would have to be greatly reduced, resulting in a corresponding reduction in the strength of the part.

The resin impregnated preform within the mold is then heated to a level and for a time sufficient to polymerize the resin saturating the fiber preform. The preform is then like a bisque-ware in ceramics such that it does not have its full strength as yet, but can be handled. The polymer preform is removed from the mold and then fired at a temperature and for a time as set forth by the manufacturer of the resin so as to ceramitize the polymer. The part or liner in its basic form is thus formed as a ceramic matrix composite having preferably about 50–60% by volume of fiber content therein.

Figure 10:
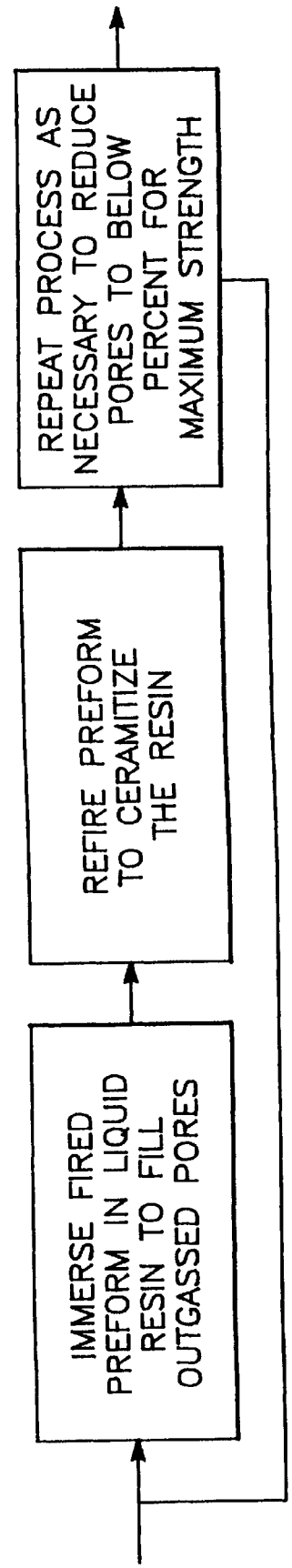
FIG. 10 is a functional block diagram of the steps added to the preferred embodiment of the present invention.

The firing process which turns the polymer to ceramic causes the formation of pores due to outgassing which takes place during the firing process. The resultant ceramic part is about 70% solid and 30% outgas-formed pores. In this regard, it is much like the monolithic ceramics previously used to line automotive parts. The fiber reinforced ceramic matrix composite parts are, of course, much stronger than the monolithic parts because of the high fiber content. The same technique, however, can be used to make the parts even stronger. According to the preferred embodiment of the present invention, that is just what is done as depicted in FIG. 10. The ceramic preform is immersed in liquid Blackglas resin (or an equivalent). The water-like viscosity of the resin causes it to fill the 30% pores in the part. The part is then fired once again for the time and at the temperature indicated by the manufacturer of the resin. This causes the resin within the 30% pores to be turned to ceramic. But, the firing process causes 30% of the 30% volume to be outgassed. So, the part is once again immersed in the liquid resin and fired for a third time. This process can be repeated until the pore removal has achieved a desired level.

The resultant part is about 95%–98% ceramic and fibers with no out-gassed pores to speak of. Thus, it is of maximum strength.

Figure 11:
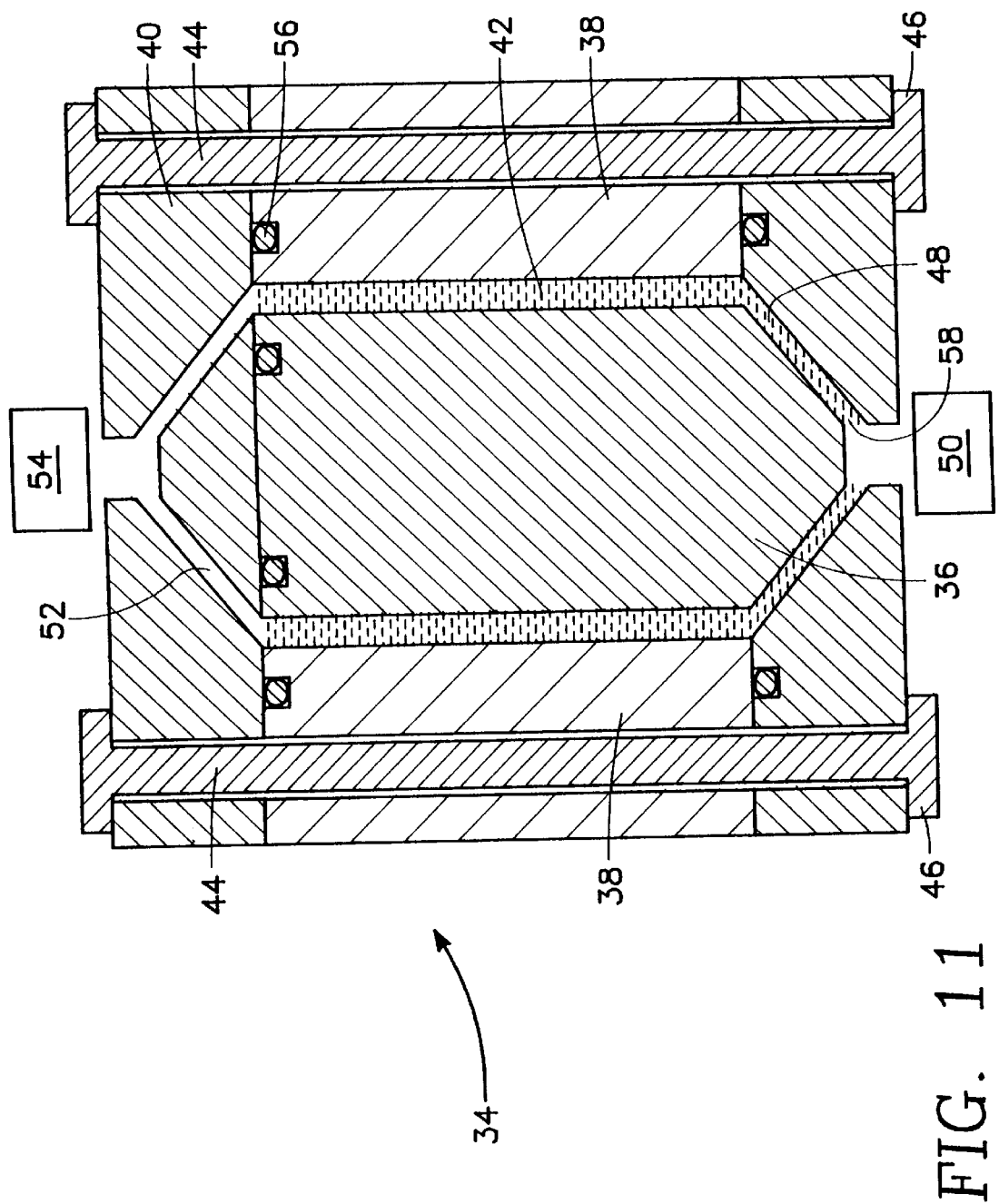
FIG. 11 is a detailed cross section of a mold used in the preferred embodiment of the present invention for making fiber reinforced ceramic matrix composite preform cylinder sleeves.

An RTM mold 34 for making fiber reinforced ceramic matrix composite cylinder sleeves according to the above-described process is depicted in FIG. 11. The mold 34 includes a base/mandrel tool portion 36 that defines the bottom and cylindrical center of the mold. Two semicylindrical half-side portions 38 define the sleeve mold internal volume in combination with the base/mandrel tool portion 36. An upper cap tool 40 closes and seals the mold.

The sleeve fiber preform 42 is slipped over the cylindrical center of the base/mandrel tool portion 36. The two half-side portions 38 are positioned around the preform 42 and the upper cap tool 40 put in its position. The entire mold 34 is then held together by the through bolts 44 and nuts 46.

The mold internal volume occupied by the preform 42 is connected by a series of feed bores 48 to a resin reservoir at 50. The upper cap tool 40 contains a series of drain bores 52 connecting the internal mold volume to a vacuum source at 54. Because of the water-like consistency of the resin, internal leakage between the components must be prevented by O-rings 56 as necessary.

With the mold 34 closed and sealed with the preform 42 in place, the vacuum source 54 is activated creating a vacuum and the path to the resin reservoir 50 is opened. Resin 58 under pressure is forced into the mold 34 and through the preform 42 from the combined pressure and the vacuum from the vacuum source 54 until the preform 42 is totally saturated with the resin 58. The entire mold 34 is then heated to polymerize the resin 58. The mold 34 is then disassembled by reversing the above-described process to release the polymerized preform 42 from the mold 34.

Figure 12:
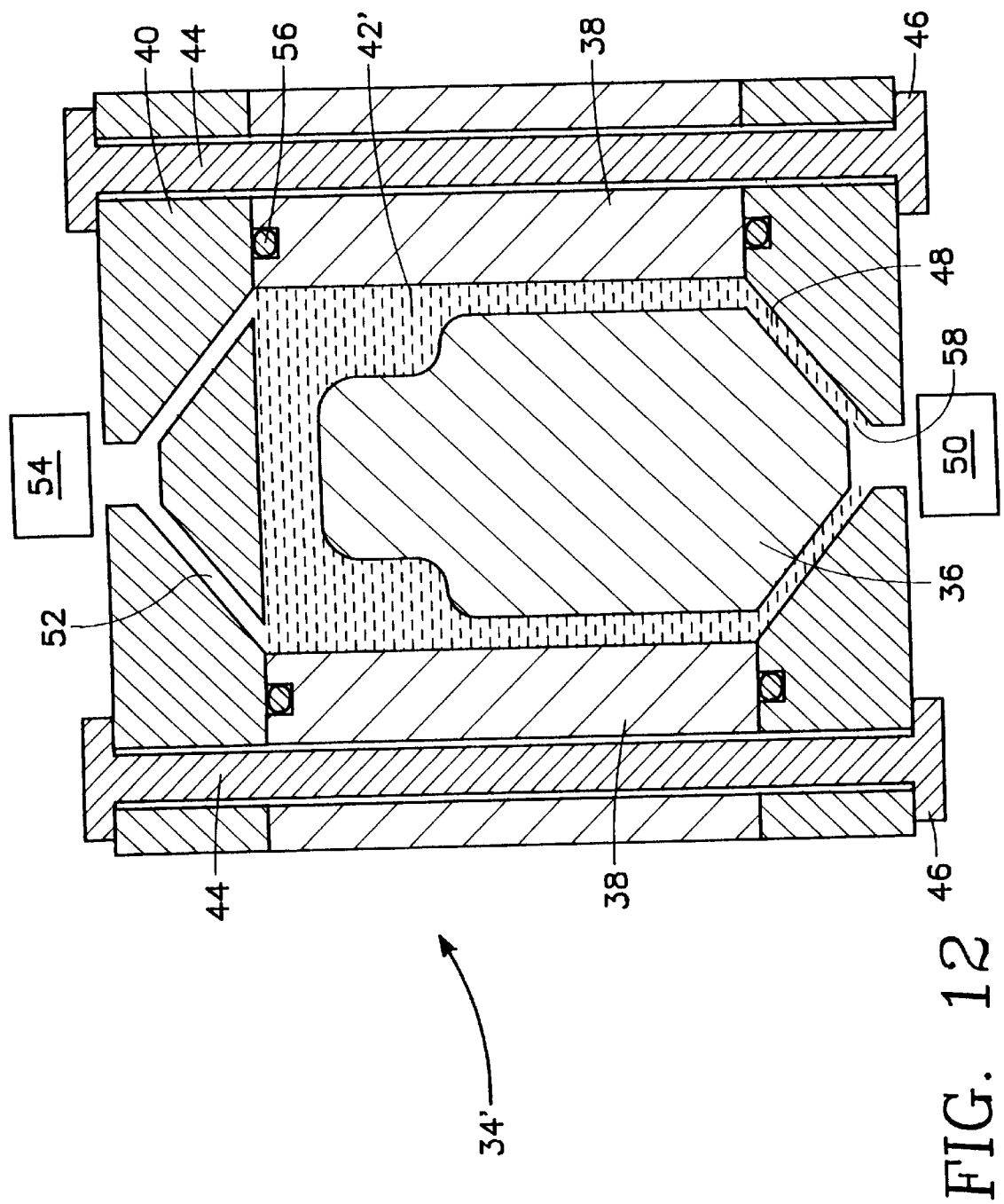
FIG. 12 is a detailed cross section of a mold used in the preferred embodiment of the present invention for making fiber reinforced ceramic matrix composite preform pistons

FIG. 12 depicts a mold 34' employed to produce a piston which is all ceramic composite matrix material according to an RTM process. The preform 42' is a piston-shape having cylindrical sidewalls and a closed top. The base/mandrel tool portion 36 has a modified central portion as shown which fits the internal shape of the piston preform 42'. Other than that, the mold 34' and manner of using it are as described above for the mold 34 of FIG. 11.

Figure 13:
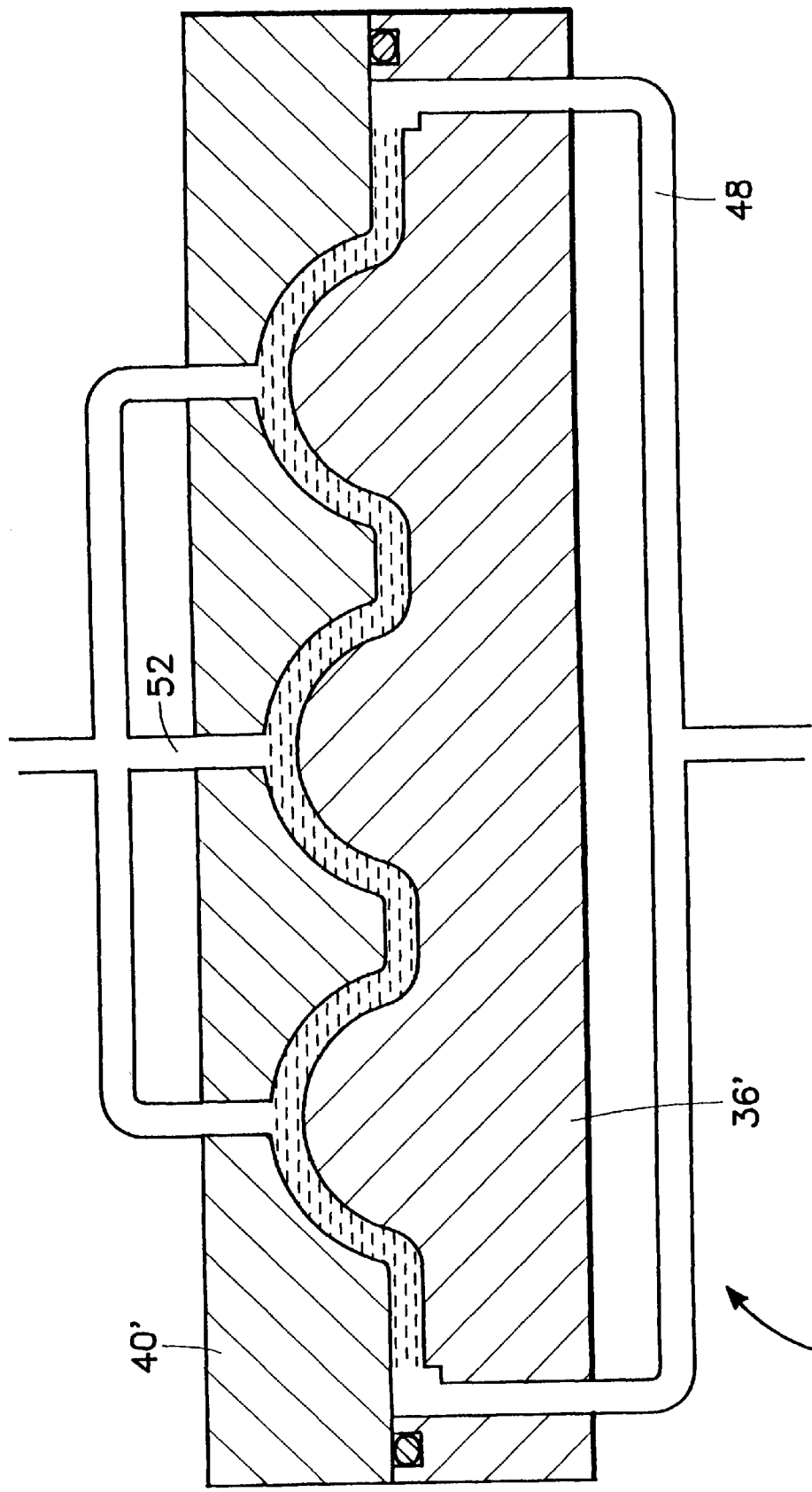
FIG. 13 is a detailed cross section of a mold used in the preferred embodiment of the present invention for making fiber reinforced ceramic matrix composite preform cylinder head liners.

For a generally planar object such as a liner for a cylinder head, a mold 34" as depicted in FIG. 13 can be used. In this case, the mandrel portion is unnecessary. Thus, the mold 34" comprises a base tool portion 36' in combination with a cap tool portion 40'. Also, more bores 48 and 52 may be required to get full saturation of the preform 42".

Figure 16:
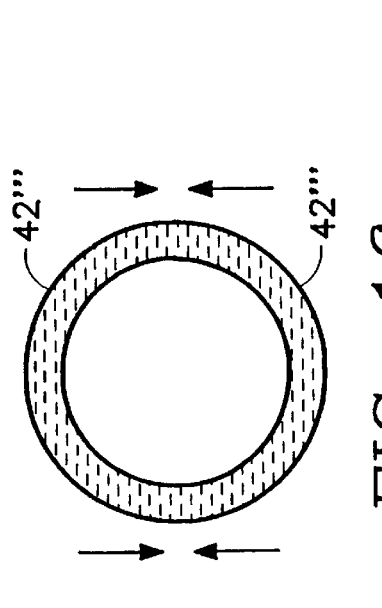
FIG. 16 is a simplified cross section showing how the two halves of the manifold produced in FIGS. 14 and 15 are connected and fused together during firing.
Figure 17:
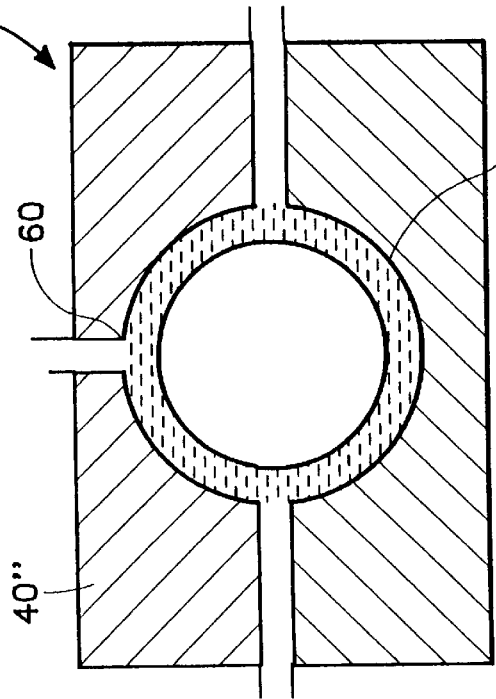
FIG. 17 is a simplified cross section of a mold used in the preferred embodiment of the present invention for making the mating half of a fiber reinforced ceramic matrix composite manifold when the first half and a ceramic foam core are used as part of the mold to reduce the necessary tooling.
Figure 14:
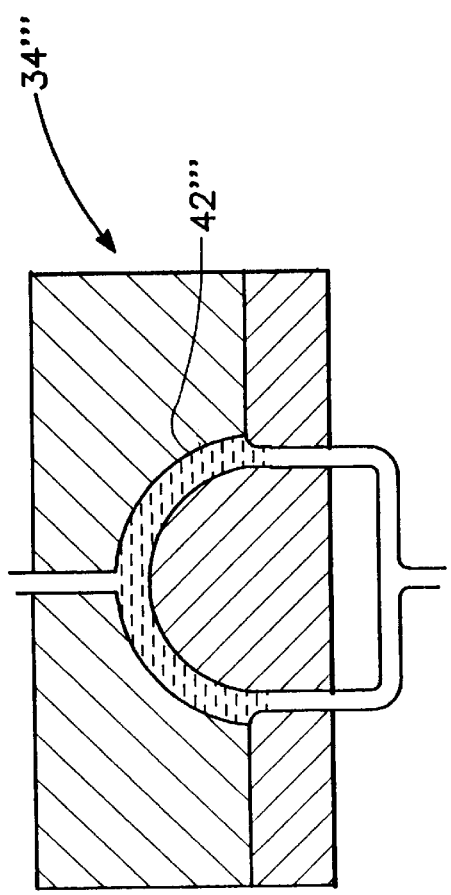
FIG. 14 is a simplified cross section of a mold used in the preferred embodiment of the present invention for making one half of a fiber reinforced ceramic matrix composite manifold.
Figure 15:
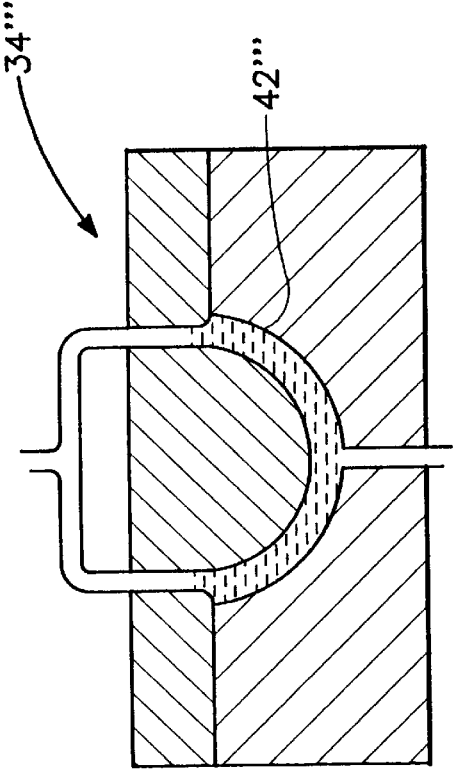
FIG. 15 is a simplified cross section of a mold used in the preferred embodiment of the present invention for making the mating half of a fiber reinforced ceramic matrix composite manifold.

A fully closed conduit type of part, such as a manifold, can be made according to the same RTM process of the present invention. Several aspects of the making of such a part are depicted in FIGS. 14–17. In FIGS. 14 and 15, we see two molds 34''' each producing half of the manifold. The mold 34''' of FIG. 14 produces the top half and the mold 34''' of FIG. 15 produces the bottom half according to the above-described process. The two polymerized half-preforms 42''' are then "snapped" together as depicted in FIG. 16. When they are subsequently fired to ceramitize the resin, the two side joints are fused together thereby joining the two preforms 42''' into a single ceramic part.

In the case of an exhaust manifold incorporating a ceramic foam 60 as a catalyst substrate, the shaped foam in combination with the bottom half preform 42''' can be used as part of the mold 34''' thereby greatly simplifying the tooling of the mold cap 40" as well as the assembly process.

Having thus described the present invention in general terms, three specific examples of parts as built and tested by the inventors herein will now be described.

EXAMPLE 1

Fabrication of a FRCMC Cylinder Sleeve

1. Fabricate or purchase a cylindrical preform of the requisite size (there are a number of U.S. vendors that weave fiber preforms for composite applications) from one of the fibers that are identified in co-pending application Ser. No. 08/515,604, filed on Aug. 16, 1995, now U.S. Pat. No. 5,638,779, entitled HIGH EFFICIENCY, LOW-POLLUTION ENGINE by the common inventors of this application and assigned to the same assignee, the teachings of which are incorporated herein by reference. The preform should be made so that when loaded in the mold tool, it takes up between 30% and 60% of the open volume within the closed tool. In the example, the preform was hand-constructed by the inventors.

2. The preform then had a fiber interface coating applied to it as per industry best practices. The assignee of this application, Northrop Corporation, currently has a number of patents on the application of interface coatings including, U.S. Pat. No. 5,034,181, entitled APPARATUS FOR METHOD OF MANUFACTURING PREFORMS; U.S. Pat. No. 5,110,771, entitled METHOD OF FORMING A PRECRACKED FIBER COATING FOR TOUGHENING CERAMIC FIBER-MATRIX COMPOSITES; U.S. Pat. No. 5,275,984, entitled FIBER COATING OF UNBONDED MULTI-LAYERS FOR TOUGHENING CERAMIC FIBER-MATRIX COMPOSITES; U.S. Pat. No. 5,162,271, entitled METHOD OF FORMING A DUCTILE FIBER COATING FOR TOUGHENING NON-OXIDE CERAMIC MATRIX COMPOSITES; and U.S. Pat. No. 5,221,578, entitled WEAK FRANGIBLE FIBER COATING WITH UNFILLED PORES FOR TOUGHENING CERAMIC FIBER-MATRIX COMPOSITES, the teachings of which are incorporated herein by reference. Also, Allied Signal or Synterials are commercial companies which will apply an interface coating as a purchased service. In the example, the interface coating was applied by the inventors as described in the above-referenced, co-pending application.

3. The cylindrical preform was then placed on the mandrel portion of the tool and the mold closed and sealed around it. It should be noted that in some instances such as with high fiber volume preforms, a hydraulic press or the like may be needed to close the mold.

4. The lower feed holes in the mold should be connected via flexible tubing with a valve to a container containing Blackglas resin. The upper vent hole was attached via flexible clear tubing with a valve to a vacuum source. Both valves were initially opened to allow the resin to be sucked up through the mold.

5. The container with the Blackglas resin was pressurized above 15 PSI, i.e. above atmospheric pressure, to create a positive pressure tending to force the resin through the mold. When the resin was flowing through the mold with no air bubbles present in the tubing on the vacuum (exit) side, both valves were closed.

6. The mold with the enclosed preform and resin mixture was then heated as per the following cycle:
   A) Ramp from ambient to 150° F. at 2.7°/minute
   b) Hold at 150° F. for 30 minutes
   C) Ramp at 1.7°/minute to 300° F.
   D) Hold at 300° F. for 60 minutes
   E) Cool at 1.2°/minute until temperature is below 140° F. for part demolding.

It should be noted that there are a variety of heat-up cycle definitions which will create a usable product and the foregoing is by way of one example only and not intended to be exclusive.

7. Upon cool-down of the mold, the mold was disassembled and the polymer composite component removed from the mold for pyrolysis.

NOTE: The previous seven steps identify a Resin Transfer Molding (RTM) approach to preparing the polymer composite component. Other applicable approaches to create the same part are Hand-Lay-up, Pultrusion, Filament Winding, Toe Placement, or Short Fiber Injection. These are all valid Polymer Composite Manufacturing Techniques to be included within the scope and spirit of the present invention and the claims appended hereto. These various techniques are not claimed to be inventive of the inventors herein in and of themselves and only the total method being described and claimed is novel to these inventors and this application.

8. The polymer composite component was then pyrolized. In this regard, fabrication of a sealable container, such as a stainless steel box, capable of withstanding 1900° F. is required for the pyrolysis cycle in a standard furnace. In the alternative, an inert gas furnace could be used if available. The box should have two tubing connections, one oh the bottom and one on the top to allow the box to be flooded with an inert gas. In this example, the sleeve was placed in the box, the box placed in a standard furnace, stainless steel tubing was connected to the lower connector on the box and to a supply of high purity argon. Any equivalent inert gas could of course, be used. The argon was allowed to flow into the box, and out the top vent at a rate of 5–10 SCFH for the entire heat cycle, thus assuring the sleeve was totally bathed in an argon environment. The furnace was closed and fired on the following basis:
   A) Ramp to 300° F. at 223°/hour
   B) Ramp to 900° F. at 43°/hour
   C) Ramp to 1400° F. at 20°/hour
   D) Ramp to 1600° F. at 50°/hour
   E) Hold at 1600° F. for 4 hours
   F) Ramp to 77° F. at –125°/hour Again, there are a variety of heating schedules other than this one, given by way of example only, which will yield usable hardware.

9. Upon cooling, the sleeve was removed from the furnace and box and submerged in a bath of Blackglas resin for enough time to allow all air to be removed from the sleeve (typically 5 minutes or more). A vacuum infiltration step may also be used for this step.

10. Step 8 was repeated.
11. Step 9 was repeated.
12. Step 8 was repeated.
13. Step 9 was repeated.
14. Step 8 was repeated.
15. Step 9 was repeated.
16. Step 8 was repeated.
17. The sleeve was now ready for pre-wear coating application machining. The sleeve was honed (commercial grade diamond cutting stones recommended) to a inner diameter which was between 0.004" and 0.070" oversized that of the finished sleeve bore dimension. If the sleeve is intended for use in a 2-stroke engine, the intake and exhaust ports should be cut at this time using conventional machining practices (commercial grade diamond coated milling tools recommended). Upon the completion of the machining processes, all sharp edges on the internal surface of the sleeve should be knocked down using diamond paper.
18. The sleeve was then placed in an oven for a time and at a temperature adequate to assure "burn off" of any of the cutting lubricants used in the machining process. (Typically 2 Hrs @ 700° F., but is lubricant dependent.)
19. The sleeve was now ready for the application of the wear coating as described in co-pending application Ser. No. 08/515,926, filed on Aug. 16, 1995, now abandoned, STRUCTURAL FIBER REINFORCED CERAMIC MATRIX COMPOSITE AUTOMOTIVE ENGINE PARTS IN SLIDING CONTACTING RELATIONSHIP by the common inventors of this application and assigned to the same assignee, the teachings of which are incorporated herein by reference. The sleeve was grit-blasted using a grit and pressure adequate to remove any loose matrix material and expose the fibers within the CMC. (Typically 100 grit @ 20 PSI).
20. The sleeve was then cleaned by using clean dry compressed air.
21. The sleeve was then loaded in a rotation table fixture which rotated the sleeve around its centerline for the plasma spray process.
22. Direct air blowers were used to cool the outside of the sleeve while minimizing any air blowing through any of the porting where applicable.

23. The plasma sprayed wear coating (from the list of possibles) was then applied using a deposition rate set to 5 grams per minute or more. The table rotation speed, plasma gun axial movement rate (in and out of the sleeve), and spray width were set to achieve a barber pole spray pattern with 50% overlap. The spray gun was set relative to the sprayed surface from 0.1 inches to 3 inches away. Particle sizes used for this process ranged from 170 to 400 mesh. Enough material was applied to achieve an undersized bore component.

24. After the application of the wear coating, the sleeve was honed (commercial grade diamond stones recommended) to achieve the final sleeve bore. At this point, the sleeve was ready for installation into an engine block.

EXAMPLE 2

Fabrication of a FRCMC Piston

1. A CMC piston was formed using RTM according to the same procedure as the cylinder sleeve of Example 1 for steps 1 through 16 thereof.

2. The component was now ready for pre-wear coating application machining. The piston was machined (commercial grade diamond cutting stones recommended) to a outer contour which was between 0.004" and 0.070" undersize that of the finished piston outer dimension. Upon the completion of the machining processes, all sharp edges on the surface of the piston were knocked down using diamond paper.

3. The piston was then be placed in an oven for a time and at a temperature adequate to assure "burn off" of any of the cutting lubricants used in the machining process. (Typically 2 Hrs @ 700° F., but is lubricant dependent.)

4. The piston was now ready for the application of the wear coating substantially as described in Example 1 with the exception that the sleeve was wear-coated on its inner surface, i.e. the one in sliding contact with the piston, while the piston was wear-coated on its exterior surface, i.e. the one in sliding contact with the sleeve. The exterior surface of the piston was grit-blasted using a grit and pressure adequate to remove any loose matrix material and expose the fibers within the CMC. (Typically 100 grit @ 20 PSI).

5. The piston was then cleaned by using clean dry compressed air.

6. The piston was then loaded in a rotation table fixture for the plasma spray process.

7. Direct air blowers were used to cool the inside of the piston.

8. The plasma sprayed wear coating (from the list of possibles) was then applied using a deposition rate set to 5 grams per minute or more. The table rotation speed, plasma gun axial movement rate (up and down the piston), and spray width were set to achieve a barber pole spray pattern with 50% overlap. The spray gun was set relative to the sprayed surface from 0.1 inches to 3 inches away. Particle sizes used for this process ranged from 170 to 400 mesh. Both the piston skirt and top were coated. Enough material was applied to achieve an oversized outside piston diameter.

9. After the application of the wear coating, the piston was turned (commercial grade diamond tools recommended) to achieve the final piston outer contour, ring grooves cut using a diamond cutting wheel, and any additional machining requirements as a function of the piston design. The completed piston was now ready for installation into an engine.

EXAMPLE 3

Fabrication of a FRCMC Head/Headliner

1. A CMC cylinder head liner and a CMC cylinder head were formed using RTM according to the same procedure as the cylinder sleeve of Example 1 for steps 1 through 16 thereof.

2. The components were now ready for pre-wear coating application machining. At this time and prior to the application of the wear coating, all holes (spark plug, valves etc.) were machined (commercial grade diamond cutting tools recommended). Upon the completion of the machining processes, all sharp edges on the surface of the head/headliner were knocked down using diamond paper.

3. The head/headliner were placed in an oven for a time and temperature adequate to assure "burn off" of any of the cutting lubricants used in the machining process. (Typically 2 Hrs@700° F., but is lubricant dependent)

4. The combustion chamber side of the head/headliner were grit-blasted using a grit and pressure adequate to remove any loose matrix material and expose the fibers within the CMC. (Typically 100 grit @ 20 PSI).

5. The head/headliner were cleaned by using clean dry compressed air.

6. The head/headliner were then loaded in a holding fixture for the plasma spray process.

7. Direct air blowers were used to cool the non-combustion chamber side of the head/headliner.

8. The plasma sprayed wear coating (from the list of possibles) was then applied using a deposition rate set to 5 grams per minute or more. The holding fixture lateral speed, plasma gun vertical movement rate (up and down the surface), and spray width were set to achieve a barber pole spray pattern with 50% overlap. The spray gun was set relative to the sprayed surface from 0.1 inches to 3 inches away. Particle sizes used for this process ranged from 170 to 400 mesh. Enough material was applied to allow for finish machining.

9. After the application of the wear coating, the head/headliner combustion chamber area was smoothed out with diamond paper or an appropriate form tool (commercial grade diamond tools recommended) to achieve the final inner contour. In the case of the cylinder head, the block mating surface of the head was also machined flat at this point and was ready for use.

10. In the case of the headliner, the component was then bonded within it's metallic mate. It could, of course, also been cast into the metallic mate. After installation with it's mate, the block mating surface of the headliner was also machined flat. The ceramic-lined metal cylinder head was then ready for use.

Wherefore, having thus described the present invention, what is claimed is:

1. A fiber reinforced ceramic matrix one-piece composite automotive part derived by:
   a) forming a fiber preform in the shape of the part from reinforcing fibers employable in fiber reinforced ceramic matrix composites;
   b) placing the preform in a cavity of a mold having the shape of the part;
   c) forcing a liquid pre-ceramic polymer resin through the cavity to fill the cavity and saturate the preform;
   d) heating the mold for a time and at a temperature sufficient to transform the preform saturated with the liquid pre-ceramic polymer resin to a polymer composite part;
   e) removing the polymer composite part from the mold; and
   f) firing the polymer composite part in an inert atmosphere for a time and at a temperature sufficient to transform the pre-ceramic polymer resin to a ceramic whereby the polymer composite part is transformed into a one-piece fiber reinforced ceramic matrix composite automotive part independently functional without juxtapositional second-structure association.

2. The automotive part of claim 1 and after step (f) thereof additionally derived by:

g) immersing the fiber reinforced ceramic matrix composite part containing pores formed by outgassing during firing into a bath of the liquid pre-ceramic polymer resin to fill the pores with the liquid pre-ceramic polymer resin;

h) firing the fiber reinforced ceramic matrix composite part in an inert atmosphere for a time and at a temperature sufficient to transform the pre-ceramic polymer resin in the pores to a ceramic; and, i) repeating steps (g) and (h) until the pore density within the final fiber reinforced ceramic matrix composite part is less than a preestablished percentage affording maximum strength to the part.

3. A fiber reinforced ceramic matrix one-piece composite engine manifold derived by:

a) forming a first preform in a shape of a lower portion of the manifold from reinforcing fibers employable in fiber reinforced ceramic matrix composites;

b) placing the first preform in a cavity of a first mold having the shape of the lower portion of the manifold;

c) forcing a liquid pre-ceramic polymer resin through the cavity to fill the cavity and saturate the first preform;

d) heating the first mold for a time and at a temperature sufficient to transform the first preform saturated with the liquid pre-ceramic polymer resin to a first polymer composite part;

e) removing the first polymer composite part from the mold;

f) forming a second preform in a shape of an upper portion of the manifold from the reinforcing fibers;

g) placing the second preform in a cavity of a second mold having the shape of the upper portion of the manifold;

h) forcing the liquid pre-ceramic polymer resin through the cavity to fill the cavity and saturate the second preform;

i) heating the second mold for a time and at a temperature sufficient to transform the second preform saturated with the liquid pre-ceramic polymer resin to a second polymer composite part;

j) removing the second polymer composite part from the mold;

k) fitting the first polymer composite part and the second polymer composite part together along mating edges to form the manifold as a hollow conduit-shaped part; and l) firing the polymer composite manifold in an inert atmosphere for a time and at a temperature sufficient to transform the pre-ceramic polymer resin to a ceramic whereby the polymer composite manifold is transformed into a fiber reinforced ceramic matrix composite manifold and the upper portion and the lower portion are fused together along the mating edges to thereby form the fiber reinforced ceramic matrix one-piece composite engine manifold independently functional as a one-piece manifold without juxtapositional second-structure association.

4. The engine manifold of claim 3 and after step (i) thereof additionally derived by:

m) immersing the fiber reinforced ceramic matrix composite manifold containing pores formed by outgassing during firing into a bath of the liquid pre-ceramic polymer resin to fill the pores with the liquid pre-ceramic polymer resin;

n) firing the fiber reinforced ceramic matrix composite manifold in an inert atmosphere for a time and at a temperature sufficient to transform the pre-ceramic polymer resin in the pores to a ceramic; and, o) repeating steps (m) and (n) until the pore density within the final fiber reinforced ceramic matrix composite manifold is less than a pre-established percentage affording maximum strength to the part.

5. A method of making a fiber reinforced ceramic matrix composite automotive part comprising the steps of:

a) forming a fiber preform in the shape of the part from reinforcing fibers of a generic fiber system employable in fiber reinforced ceramic matrix composites;

b) saturating the preform with a liquid pre-ceramic polymer resin;

c) heating the preform for a time and at a temperature sufficient to transform the preform saturated with the liquid pre-ceramic polymer resin to a polymer composite part; and d) firing the polymer composite part in an inert atmosphere for a time and at a temperature sufficient to transform the pre-ceramic polymer resin to a ceramic to transform the polymer composite part into a one-piece fiber reinforced ceramic matrix composite automotive part independently functional without juxtapositional second-structure association.

6. The method of claim 5 and after step (d) thereof additionally comprising the steps of:

e) immersing the fiber reinforced ceramic matrix composite part containing pores formed by outgassing during firing into a bath of the liquid pre-ceramic polymer resin to fill the pores with the liquid pre-ceramic polymer resin;

f) firing the fiber reinforced ceramic matrix composite part in an inert atmosphere for a time and at a temperature sufficient to transform the pre-ceramic polymer resin in the pores to a ceramic; and g) repeating steps (e) and (f) until the pore density within the final fiber reinforced ceramic matrix composite part is less than a preestablished percentage affording maximum strength to the part.

7. A method of making a fiber reinforced ceramic matrix one-piece composite engine manifold comprising the steps of:

a) forming a first preform in a shape of a lower portion of the manifold from reinforcing fibers employable in fiber reinforced ceramic matrix composites;

b) saturating the first preform with a liquid pre-ceramic polymer resin;

c) heating the first preform for a time and at a temperature sufficient to transform the first preform saturated with the liquid pre-ceramic polymer resin to a first polymer composite part;

d) forming a second preform in a shape of an upper portion of the manifold from the reinforcing fibers;

e) saturating the second preform with a liquid pre-ceramic polymer resin;

f) heating the second preform for a time and at a temperature sufficient to transform the second preform saturated with the liquid pre-ceramic polymer resin to a second polymer composite part;

g) fitting the first polymer composite part and the second polymer composite part together along mating edges to form the manifold as a hollow conduit-shaped part; and h) firing the polymer composite manifold in an inert atmosphere for a time and at a temperature sufficient to transform the pre-ceramic polymer resin to a ceramic to transform the polymer composite manifold into a fiber reinforced ceramic matrix composite manifold, wherein the upper portion and the lower portion are fused together along the mating edges to thereby form the fiber reinforced ceramic matrix one-piece composite engine manifold independently functional as a one-piece manifold without juxtapositional second-structure association.

8. The method engine manifold of claim 7, and after step (h) thereof additionally comprising the steps of:

i) immersing the fiber reinforced ceramic matrix composite manifold containing pores formed by outgassing during firing into a bath of the liquid pre-ceramic polymer resin to fill the pores with the liquid pre-ceramic polymer resin;

j) firing the fiber reinforced ceramic matrix composite manifold in an inert atmosphere for a time and at a temperature sufficient to transform the pre-ceramic polymer resin in the pores to a ceramic; and, k) repeating steps (i) and (j) until the pore density within the final fiber reinforced ceramic matrix composite manifold is less than a pre-established percentage affording maximum strength to the part.

* * * * *